United States Patent
Ohnogi et al.

(10) Patent No.: US 8,893,860 B2
(45) Date of Patent: Nov. 25, 2014

(54) WORK VEHICLE AND BRAKE DEVICE THEREOF

(71) Applicant: Komatsu Ltd., Tokyo (JP)

(72) Inventors: Hiroaki Ohnogi, Komatsu (JP); Fumiaki Nakada, Komatsu (JP); Keita Naruge, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/825,639

(22) PCT Filed: Oct. 11, 2012

(86) PCT No.: PCT/JP2012/076300
§ 371 (c)(1),
(2), (4) Date: Mar. 22, 2013

(87) PCT Pub. No.: WO2013/108447
PCT Pub. Date: Jul. 25, 2013

(65) Prior Publication Data
US 2014/0112747 A1    Apr. 24, 2014

(30) Foreign Application Priority Data

Jan. 17, 2012  (JP) .................................. 2012-006870

(51) Int. Cl.
| | |
|---|---|
| *F16D 65/62* | (2006.01) |
| *F16D 55/40* | (2006.01) |
| *F16D 65/14* | (2006.01) |
| *E02F 3/36* | (2006.01) |
| *B60T 1/06* | (2006.01) |
| *F16D 65/18* | (2006.01) |
| *F16D 65/54* | (2006.01) |

(52) U.S. Cl.
CPC ................ *F16D 65/62* (2013.01); *F16D 55/40* (2013.01); *F16D 65/14* (2013.01); *E02F 3/36* (2013.01); *B60T 1/065* (2013.01); *F16D 65/18* (2013.01); *F16D 65/54* (2013.01)
USPC ......................................... 188/71.5; 188/71.8

(58) Field of Classification Search
CPC ............. F16D 65/62; E02F 3/36; B60T 1/065
USPC ...................................... 188/71.5, 71.7, 71.8
See application file for complete search history.

(56) References Cited

U.S. PATENT DOCUMENTS 4,146,116 A * 3/1979 Cumming .................... 188/71.5

FOREIGN PATENT DOCUMENTS

| JP | 52-71694 U | 5/1977 |
|---|---|---|
| JP | 59-7927 U | 1/1984 |
| JP | 63120921 A | 5/1988 |

(Continued)

OTHER PUBLICATIONS

International Search Report for PCT/JP2012/076300.

*Primary Examiner* — Christopher Schwartz
(74) *Attorney, Agent, or Firm* — Global IP Counselors, LLP

(57) ABSTRACT

A brake device for a work vehicle includes a brake unit including a brake disc plate and a piston having a slide portion slidably supported by an axle housing and a pressure portion for pressing the brake disc plate. A slack adjuster mechanism is disposed on the axially opposite side of the brake disc plate with respect to the piston while being disposed further on an inner peripheral side than the slide portion of the piston. The slack adjuster mechanism maintains a clearance between the piston and the brake disc plate at a predetermined clearance by mechanically adjusting a non-actuated position of the piston.

9 Claims, 6 Drawing Sheets

(56) References Cited

FOREIGN PATENT DOCUMENTS

| | | | |
|---|---|---|---|
| JP | 6-109045 A | 4/1994 |
| JP | 2001-193773 A | 7/2001 |
| JP | 2005-29117 A | 2/2005 |
| JP | 2011-196480 A | 10/2011 |

* cited by examiner

WORK VEHICLE AND BRAKE DEVICE THEREOF

CROSS-REFERENCE TO RELATED APPLICATIONS

This application claims priority to Japanese Patent Application No. 2012-006870 filed on Jan. 17, 2012, the disclosure of which is hereby incorporated herein by reference in its entirety.

TECHNICAL FIELD

The present invention relates to a brake device, particularly to a work vehicle brake device mounted within an axle housing of a work vehicle. Further, the present invention relates to a work vehicle including the brake device.

BACKGROUND ART

In work vehicles such as backhoe loaders, power is transmitted from an engine to a differential through a transmission, and is further transmitted from axles to wheels through final reducers. Further, brake devices are mounted between the differential and the final reducers in order to brake rotation of the axles.

Brake devices of this type are disposed inside an axle housing and a gear housing, and employ a wet multi-plate hydraulic braking type. Specifically, the housing accommodates brake units, each of which is formed by a plurality of brake disc plates and a piston to be actuated by means of hydraulic pressure. Further, the piston is actuated by means of brake hydraulic pressure to be supplied thereto from the outside, and the plural brake disc plates are pressed to each other. Accordingly, a rotary member such as an axle is configured to be braked.

Some of such brake devices are provided with a slack adjuster mechanism in order to prevent the stroke of the piston from being changed from its initial state even when the brake disc plates are abraded.

For example, in a device described in Japan Laid-open Patent Application Publication No. JP-A-2001-193773, an adjustment screw making contact with a piston is provided while being operable from the outside of a cylinder. A return position of the piston is adjusted by the adjustment screw. The aforementioned slack adjuster mechanism described in the above mentioned publication is of a mechanical type including the adjustment screw. However, a mechanism has been also provided that is configured to execute automatic adjustment by means of hydraulic pressure.

SUMMARY

In the device described in Japan Laid-open Patent Application Publication NO. JP-A-2001-193773, the stroke of the piston can be set constant by externally operating the adjustment screw. However, adjustment is required to be manually executed. This makes it difficult to execute appropriate adjustment at an appropriate timing.

Further, a drawback is produced that the mechanism, configured to execute automatic adjustment by means of hydraulic pressure, requires a complex component such as a hydraulic circuit and becomes inevitably quite expensive.

It should be noted that a device, configured to mechanically execute automatic adjustment without using hydraulic pressure, has been already provided as a heretofore known technology. In this type of device, a slack adjuster mechanism is disposed on the outer peripheral side of a slide portion of a piston in order to form the device with a compact axial dimension.

However, in such heretofore known technology, the slack adjuster mechanism is disposed on the outer peripheral side of the slide portion of the piston. Therefore, a housing accommodating these components is increased in its outer diameter size.

It is an object of the present invention to implement a slack adjuster mechanism with a compact structure at a low cost in a work vehicle brake device.

A brake device for a work vehicle according to a first aspect of the present invention is disposed within an axle housing of a work vehicle, and includes a brake unit and a slack adjuster mechanism. The brake unit includes a brake disc plate and a piston that has a slide portion slidably supported by the axle housing and a pressure portion on which a pressure surface is formed for pressing the brake disc plate. The slack adjuster mechanism is formed by a member, which is disposed on a piston rear surface side axially opposite to the brake disc plate through the piston while being disposed further on an inner peripheral side than the slide portion of the piston, and which is disposed further on the piston rear surface side than a pressure portion side end surface of the piston. The slack adjuster mechanism maintains a clearance between the piston and the brake disc plate at a predetermined clearance by mechanically adjusting a non-actuated position of the piston.

Here, the slack adjuster mechanism is disposed oppositely to the brake disc plate through the piston, while being disposed on the inner peripheral side of the slide portion of the piston. Therefore, increase in a radial dimension can be avoided. It should be noted that an empty space generally exists on the vehicle inner side of the brake disc plate in the inside of the axle housing. In the present invention, the empty space is utilized for disposing the slack adjuster mechanism. Therefore, increase in an axial dimension can be avoided.

A brake device for a work vehicle according to a second aspect of the present invention relates to the device of the first aspect, and wherein the slide portion of the piston is formed in a tubular shape while being axially protruded from a lateral surface opposite to the pressure surface of the pressure portion.

A brake device for a work vehicle according to a third aspect of the present invention relates to the device of the second aspect, and wherein the slack adjuster mechanism includes a tubular carrier, a rod and an adjustment portion. The tubular carrier is disposed on the inner peripheral side of the slide portion of the piston and has a plurality of cases. The rod is disposed within the case while being axially movable; a tip portion thereof is protruded from the case and is coupled to an inner peripheral part of the piston; a tip surface thereof is positioned further on the piston rear surface side than the pressure portion side end surface of the piston. The adjustment portion is disposed within the case and is configured to adjust a protruded amount of the rod from the case in a non-actuated state of the piston in accordance with an abrasion amount of the brake disc plate.

Here, when the piston is actuated, the rod is moved in conjunction. Therefore, the stroke of the piston can be determined based on the displacement of the rod. Further, the adjustment portion adjusts the protruded amount of the rod from the case in a non-actuated state of the piston in accordance with the abrasion amount of the brake disc plate. Therefore, the piston stroke can be set constant regardless of abrasion of the brake disc plate.

Further, the rod and the adjustment portion are disposed within the case. Therefore, the axial dimension can be reduced.

A brake device for a work vehicle according to a fourth aspect of the present invention relates to the device of the third aspect, and wherein each of the cases includes a first opening, a second opening and a third opening aligned sequentially from a brake unit side along an axial direction. The first opening is penetrated by the rod. The second opening has a diameter greater than that of the first opening. The third opening, in which the adjustment portion is disposed, has a diameter greater than that of the second opening.

A brake device for a work vehicle according to a fifth aspect of the present invention relates to the device of the fourth aspect, and wherein the slack adjuster mechanism further includes a return spring for retracting the rod and the piston to the non-actuated position when an actuating force is released from acting on the piston, and the return spring is disposed in the second opening.

A brake device for a work vehicle according to a sixth aspect of the present invention relates to the device of the fourth or fifth aspect, and wherein the adjustment portion includes a restriction member that restricts an axial position of the rod with respect to the carrier while being held on an outer peripheral surface of the rod with a predetermined friction force. Further, the restriction member is configured to be axially moved with respect to the rod against the holding force attributed to friction in accordance with the abrasion amount of the brake disc plate when the piston is pressed towards the brake disc plate.

Here, the restriction member is axially moved in accordance with the abrasion amount of the brake disc plate, and accordingly, the piston stroke can be set constant.

A brake device for a work vehicle according to a seventh aspect of the present invention relates to the device of the sixth aspect, and wherein the restriction member has a diameter greater than an inner diameter of the second opening and is contactable with a bottom surface of the third opening when the piston is pressed towards the brake disc plate.

A brake device for a work vehicle according to an eighth aspect of the present invention relates to the device of any of the fourth to seventh aspects, and wherein the slack adjuster mechanism further includes a stopper disposed in the third opening for stopping the restriction member held by the rod from moving.

A brake device for a work vehicle according to a ninth aspect of the present invention relates to the device of any of the fourth to eighth aspects, and wherein the rod includes a rod main body and a coupling portion. The rod main body penetrates through the first opening, the second opening and the third opening. The coupling portion is formed on one end of the rod main body, has an outer diameter less than an outer diameter of the rod main body, and is coupled to the piston while being inserted into a hole formed in the inner peripheral part of the piston. Further, a coupling portion side end surface of the rod main body makes contact with the end surface of the piston. A work vehicle according to a tenth aspect of the present invention includes: a frame supporting a machinery; a cab mounted on the frame; a working unit disposed either forwards or rearwards of the cab; a plurality of wheels; an axle housing supported by the frame; an axle that is disposed inside the axle housing and is coupled to the wheel; and the brake device recited in any of the first to ninth aspects for braking rotation of the axle.

A work vehicle according to an eleventh aspect of the present invention relates to the work vehicle of the eighth aspect, and further includes a final reducer disposed between the axle and the wheel.

A work vehicle according to a twelfth aspect of the present invention relates to the work vehicle of the eleventh aspect, and wherein the brake device is disposed on a vehicle inner side of the final reducer.

According to the present invention as described above, the slack adjuster mechanism can be disposed by utilizing an axial space. The brake device can be thereby compactly structured.

DESCRIPTION OF THE EMBODIMENTS

Structure of Work Vehicle

Figure 1:
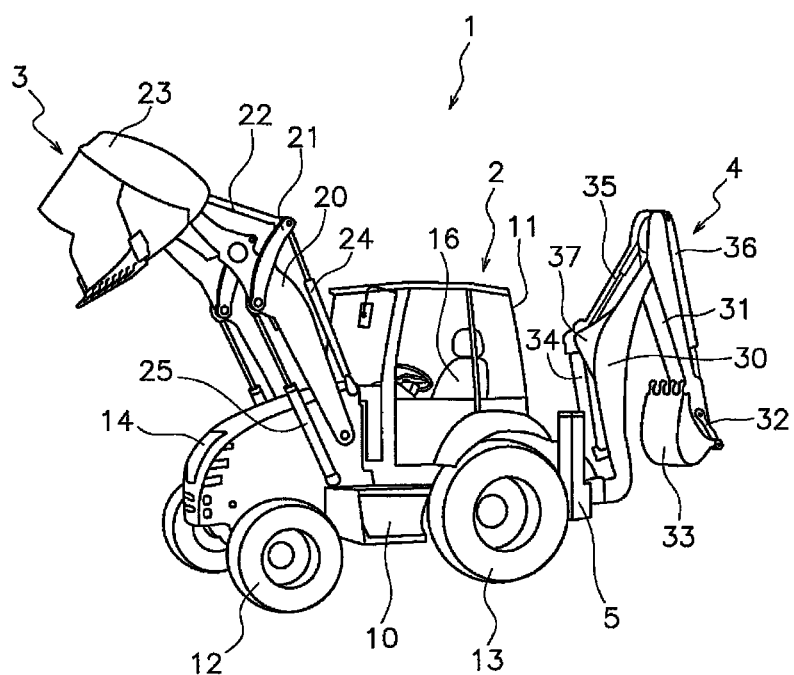
FIG. 1 is an external perspective view of a backhoe loader embedded with a brake device according to an exemplary embodiment of the present invention.

FIG. 1 illustrates an external view of a backhoe loader 1 according to an exemplary embodiment of the present invention. The backhoe loader 1 is a stand-alone work vehicle that can execute an excavation work and a loading work. The backhoe loader mainly includes a main body 2, a loader 3, a backhoe 4 and right and left stabilizers 5.

The main body 2 includes a frame 10 supporting machineries such as an engine and a transmission, a cab 11 mounted on the frame 10, a pair of front wheels 12 and a pair of rear wheels 13. In the backhoe loader 1 of the present exemplary embodiment, the diameter of the rear wheel 13 is greater than that of the front wheel 12. Therefore, an axle coupled to the front wheel 12 is disposed in a position lower than that of an axle coupled to the rear wheel 13. The machineries such as the engine and the transmission are covered with an exterior cover 14. An operator's seat 16 on which an operator is seated is disposed inside the cab 11. The operator's seat 16 is rotatable between a forwardly oriented position and a backwardly oriented position. Further, a steering wheel, a variety of pedals and operating members for operating the loader 3 and the backhoe 4 are disposed inside the cab 11.

The engine is installed in the front part of the frame 10. The engine drives the front wheels 12 and the rear wheels 13 through the transmission and the axles and drives hydraulic pumps for actuating a variety of hydraulic machines. Further, the transmission is provided with a plurality of shafts, and each of the shafts other than a reverse shaft is provided with either a hydraulic clutch or a hydraulic brake.

The loader 3 is a working unit disposed forwards of the cab 11 for executing a loading work. The loader 3 includes loader arms 20, brackets 21, links 22, a loader bucket 23, bucket cylinders 24 and arm cylinders 25.

The base ends of the loader arms 20 are rotatably supported by the frame 10, while the loader bucket 23 is rotatably attached to the tip ends of the loader arms 20. The base ends of the brackets 21 are rotatably supported by the loader arms 20, while the tip ends of rods of the bucket cylinders 24 and one ends of the links 22 are rotatably coupled to the tip ends of the brackets 21. The base ends of the bucket cylinders 24 are rotatably supported by the frame 10. Further, the tip ends of the links 22 are rotatably coupled to the bucket 23. The base ends of the arm cylinders 25 are rotatably supported by the frame 10, while the tip ends of rods of the arm cylinders 25 are rotatably coupled to longitudinally intermediate portions of the loader arms 20.

With the aforementioned structure, the loader arms 20 are upwardly rotated when the rods of the arm cylinders 25 are protruded, whereas the loader arms 20 are downwardly rotated when the rods of the arm cylinders 25 are retracted. Further, when the rods of the bucket cylinders 24 are protruded, the brackets 21 are forwardly rotated. Accordingly, the links 22 are forwardly moved and the loader bucket 23 is downwardly rotated. Contrarily, when the rods of the bucket cylinders 24 are retracted, the brackets 21 are backwardly rotated. Accordingly, the links 22 are backwardly moved and the loader bucket 23 is upwardly rotated.

The backhoe 4 is a working unit disposed rearwards of the cab 11 for executing an excavation work. The backhoe 4 includes a boom 30, an arm 31, a bucket link 32, a backhoe bucket 33, a boom cylinder 34, an arm cylinder 35 and a bucket cylinder 36. The base end of the boom 30 is supported by the frame 10 through a bracket (not illustrated in the figures) while being rotatable in the right-and-left direction. The base end of the aim 31 is rotatably coupled to the tip end of the boom 30, while the backhoe bucket 33 is rotatably coupled to the tip end of the arm 31. One end of the boom cylinder 34 is rotatably coupled to a bracket (not illustrated in the figures) fixed to the frame 10, while the other end of the boom cylinder 34 is rotatably coupled to a boom bracket 37 fixed to the boom 30. One end of the aim cylinder 35 is rotatably coupled to the boom bracket 37, while the other end of the arm cylinder 35 is rotatably coupled to the base end of the arm 31. The base end of the bucket cylinder 36 is rotatably coupled to the arm 31, while the tip end of the bucket cylinder 36 is rotatably coupled to the bucket link 32.

With the structure as described above, the boom 30 is rotated downwards when a rod of the boom cylinder 34 is protruded, whereas the boom 30 is rotated upwards when the rod of the boom cylinder 34 is retracted. Further, the arm 31 is rotated downwards when a rod of the arm cylinder 35 is protruded, whereas the arm 31 is rotated upwards when the rod of the arm cylinder 35 is retracted. Moreover, when a rod of the bucket cylinder 36 is protruded, the backhoe bucket 33 is rotated through the bucket link 32 and an opening of the backhoe bucket 33 approaches the arm 31. On the other hand, when the rod of the bucket cylinder 36 is retracted, the backhoe bucket 33 is rotated through the bucket link 32 and the opening of the backhoe bucket 33 is separated away from the arm 31.

It should be noted that the backhoe 4 includes a bracket cylinder for rotating the boom bracket coupling the boom 30 to the frame 10 in the right-and-left direction although not illustrated in the figures. One end of the bracket cylinder is rotatably coupled to the frame 10, whereas the other end of the bracket cylinder is rotatably coupled to the boom bracket. The boom bracket is rotated to one side in the right-and-left direction when a rod of the bracket cylinder is protruded, whereas the boom bracket is rotated to the other side in the right-and left direction when the rod of the bracket cylinder is retracted.

The right and left stabilizers 5 serve to prevent the backhoe loader 1 from falling down by stabilizing the posture of the backhoe loader 1 during execution of a work with the backhoe 4. The right and left stabilizers 5 are respectively disposed on the rear right part and the rear left part of the frame 10. The posture of the backhoe loader 1 can be stabilized in executing an excavation work by causing the stabilizers 5 to make contact with the ground while the stabilizers 5 are laterally stretched on the right and left sides of the backhoe loader 1 and by lifting up the rear part of the main body of the backhoe loader 1 until the rear wheels 13 are separated away from the ground.

Brake Device and Axle Housing

Figure 2:
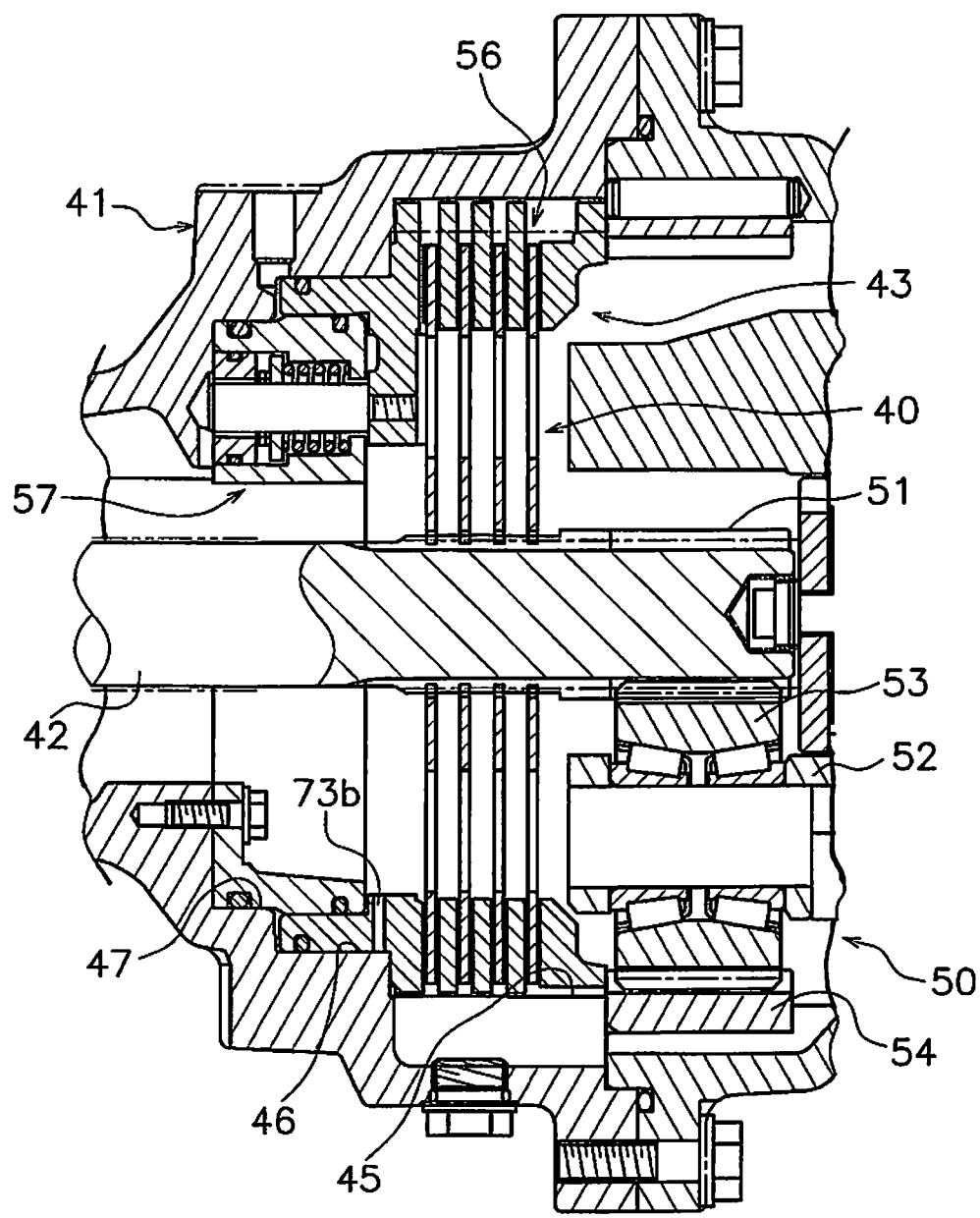
FIG. 2 is a cross-sectional structural view of the brake device.

As illustrated in FIG. 2, the backhoe loader 1 is provided with brake devices 40 for braking the rear wheels 13. Each brake device 40 is disposed inside an axle housing 41 (see FIG. 2) supported by the lower part of the frame 10.

In the following explanation, "an outer side" is an outside in the right-and-left direction (width direction) of the vehicle and refers to a side on which each wheel is disposed. On the other hand, "an inner side" is an inner side in the right-and-left direction of the vehicle, and in the axle housing, refers to a side on which a differential is disposed.

The axle housing 41 is extended transversely right and left of the vehicle, and axles 42 penetrate through the inside of the axle housing 41. Further, a differential is disposed in a vehicle width directionally center part (left side in FIG. 2) on a vehicle inner side within the axle housing 41, although not illustrated in the figures.

Each of the both right and left end portions of the axle housing 41 has a diameter extended to the outer side and has a brake device accommodation space 43 in the inside thereof. Each brake device accommodating space 43 has a first accommodating portion 45 formed outermost (on the right side in FIG. 2), a second accommodating portion 46 formed on the inner side of the first accommodating portion 45, and a third accommodating portion 47 formed on the further inner side of the second accommodating portion 46. The diameters of the respective accommodating portions 45 to 47 get smaller in the order of the first accommodating portion 45, the second accommodating portion 46 and the third accommodating portion 47.

Further, the outer end portion of each brake device accommodating space 43 is opened and a final reducer 50 is attached to the opening. Further, each rear wheel 13 (not illustrated in FIG. 2) is disposed on the output side of each final reducer 50.

It should be noted that a sun gear 51, forming a part of the final reducer 50, is formed on the tip portion of the axle 42. Each final reducer 50 is structured similarly to a conventional final reducer and includes: a plurality of planet gears 53 that are rotatably supported by a carrier 52 while being meshed with the sun gear 51; and a ring gear 54 meshed with the planet gears 53.

Brake Device

Each brake device 40 includes a brake unit 56 disposed on the rear wheel 13 side and a slack adjuster mechanism 57 disposed on the vehicle inner side of the brake unit 56.

Brake Unit

Figure 3:
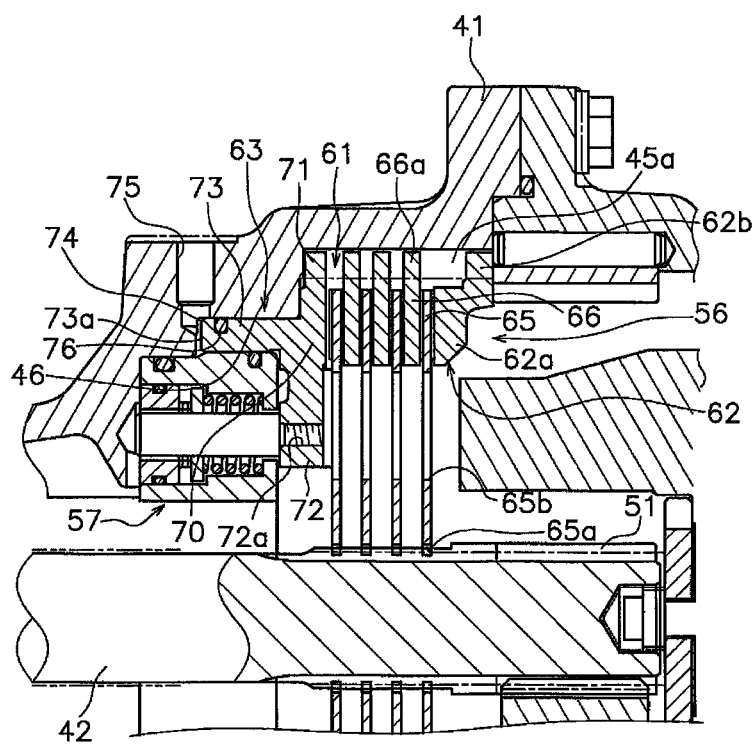
FIG. 3 is a cross-sectional structural view of a brake unit.

As illustrated in FIG. 3, each brake unit 56 includes a plurality of brake disc plates 61, a back-up plate 62 and a piston 63.

The brake disc plates 61 include four first disc plates 65 and three second disc plates 66, each of which is disposed adjacent two of the four first disc plates 65. Each first disc plate 65 is formed in an annular shape and is provided with friction members attached to the both faces of the outer peripheral part thereof. Further, the first disc plate 65 has inner teeth 65a formed on the inner peripheral part thereof; and the inner teeth 65a are meshed with a part of the sun gear 51 formed on the outer peripheral surface of the axel 42. Therefore, the first disc plate 65 is axially movable with respect to the axle 42 while being non-rotatable relatively thereto. It should be noted that the first disc plate 65 has a plurality of openings 65b in a radially middle part thereof for reducing the weight thereof and allowing lubricating oil to flow therethrough.

Each second disc plate 66 is an annular plate member having an inner diameter roughly the same as that of each friction member of each first disc plate 65. The second disc plate 66 has a plurality of teeth 66a on the outer peripheral surface thereof. On the other hand, the first accommodating portion 45 has a plurality of recesses 45a on the inner wall thereof. The teeth 66a of the second disc plate 66 are meshed with the recesses 45a. Therefore, the second disc plate 66 is axially movable with respect to the axle housing 41 while being non-rotatable relatively thereto.

The back-up plate 62 is disposed on the further outer side of the outermost one of the first disc plates 65. The back-up plate 62 is formed in an annular shape and has a receiver portion 62a on the inner peripheral side thereof and an engaging portion 62b on the outer peripheral side thereof. The receiver portion 62a and the engaging portion 62b are axially disposed for forming a step. Further, each of the receiver portion 62a and the engaging portion 62b has a thickness greater than that of each second disc plates 66. The inner diameter of the receiver portion 62a is the same as that of each second disc plate 66. Further, the shape of the engaging portion 62b is the same as that of the teeth 66a of each second disc plate 66. In other words, the engaging portion 62b is formed by a plurality of teeth and is engaged with the recesses 45a of the first accommodating portion 45. Therefore, similarly to the second disc plates 66, the back-up plate 62 is axially movable with respect to the axle housing 41 while being non-rotatable relatively thereto.

The piston 63 is disposed on the further inner side of the innermost one of the first disc plates 65. The piston 63 is an annular member and has a pressure portion 70, an engaging portion 71, a plurality of attachment portions 72 and a slide portion 73.

The pressure portion 70 is formed in an annular shape and has a pressure surface on a part thereof opposed to the first disc plates 65 in order to press the friction member of the first disc plate 65.

The engaging portion 71 is formed on the outer peripheral side of the pressure portion 70, and has a shape similar to that of the outer peripheral part of each second disc plate 66. In other words, the engaging portion 71 has a plurality of teeth. The plural teeth are meshed with the recesses 45a of the first accommodating portion 45. Therefore, the piston 63 is axially movable with respect to the axle housing 41 while being non-rotatable relatively thereto.

The plural (three in the present exemplary embodiment) attachment portions 72 as the inner peripheral part of the piston 63 are formed and protruded to the inner peripheral side of the pressure portion 70, while being circumferentially disposed at equal intervals. Each attachment portion 72 has an attachment screw hole 72a formed for attaching the slack adjuster mechanism 57 thereto.

The slide portion 73 is formed in a tubular shape while being axially protruded from the rear surface side of the pressure portion 70, i.e., a lateral surface disposed oppositely to the pressure surface. The outer peripheral surface of the slide portion 73 has a diameter less than the outer diameter of the pressure portion 70, and is slidably supported by the inner peripheral surface of the second accommodating portion 46. Further, the slide portion 73 has an axial length less than that of the second accommodating portion 46, and a clearance is produced as an oil chamber 74 between a tip 73a of the slide portion 73 and a sidewall of the second accommodating portion 46 while the piston 63 is moved innermost. Further, an oil path 75 for supplying operating oil is formed in the axle housing 41 while being communicated with the oil chamber 74.

It should be noted that the slide portion 73 has an annular groove formed on the outer peripheral surface thereof, and a seal member 76 is disposed in the annular groove. Further, as illustrated in FIG. 2, the slide portion 73 has a through hole 73b that is formed in the outermost part thereof while radially penetrating therethrough. The operating oil on the rear surface of the pressure portion 70 is discharged to the inner peripheral side through the through hole 73b.

Slack Adjuster Mechanism

Each slack adjuster mechanism 57 is disposed on the further inner side of the pressure portion 70 and the attachment portions 72 of each piston 63. In other words, as is obvious from FIGS. 2 to 4, the piston 63 sections the brake device accommodating space 43 into a space in which the brake disc plates 61 are disposed and a space in which the slack adjuster mechanism 57 is disposed. In more detail, the slack adjuster mechanism 57 is disposed in a space formed by the third accommodating portion 47 and a space enclosed by the attachment portions 72 and the slide portion 73 of the piston 63.

Figure 4:
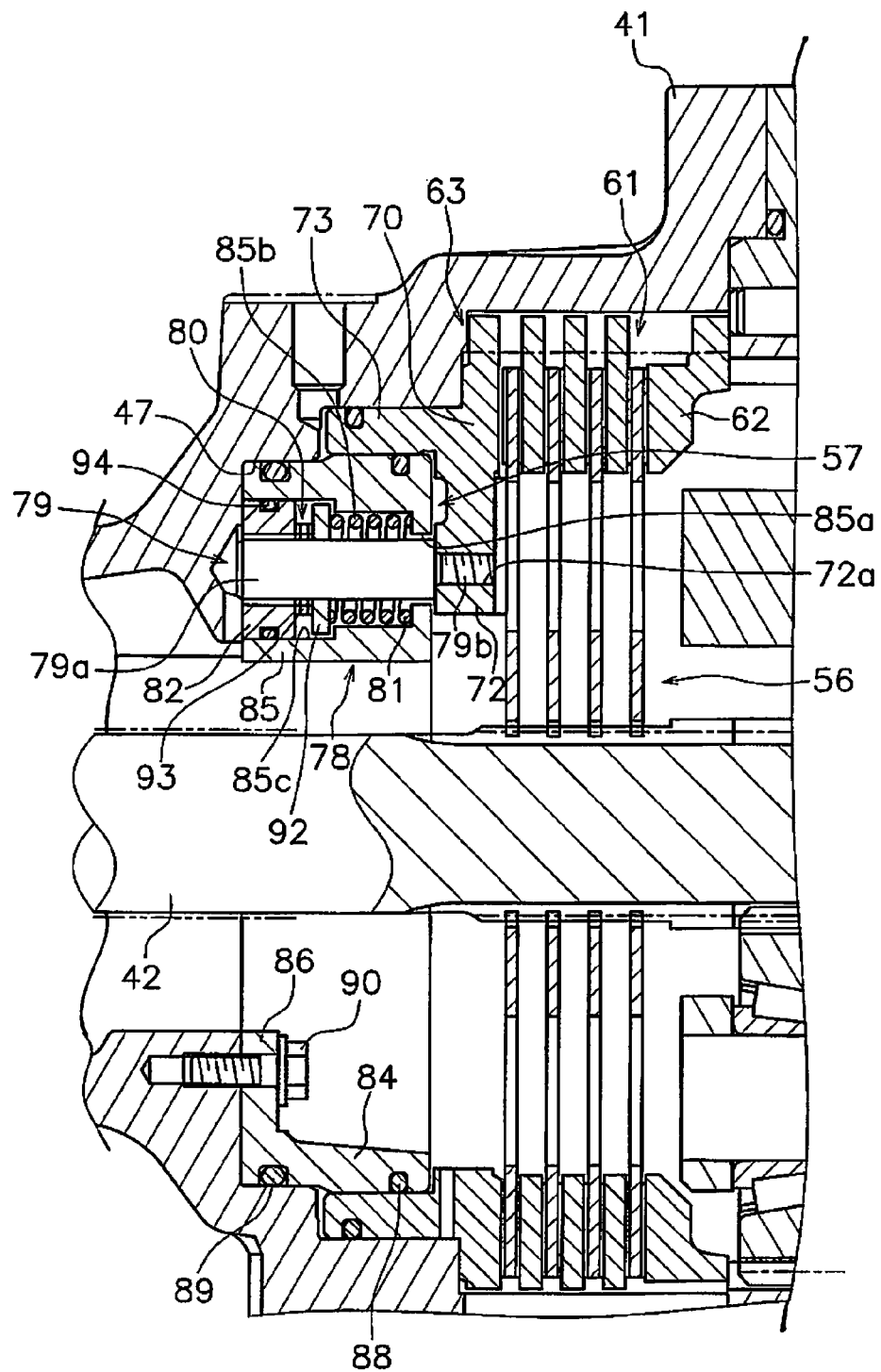
FIG. 4 is a cross-sectional structural view of a slack adjuster mechanism.

The slack adjuster mechanism 57 is a mechanism configured to mechanically adjust the non-actuated position of the piston 63 for maintaining a clearance between the piston 63 and the brake disc plates 61 at a predetermined amount. As illustrated in FIG. 4, the present slack adjuster mechanism 57 includes a carrier 78, rods 79, adjustment portions 80, return springs 81 and stoppers 82.

The carrier 78 is formed in an annular shape and has a tubular support portion 84, a plurality of cases 85 and a fixation portion 86.

The outer part of the outer peripheral surface of the support portion 84 is supported in contact with the inner peripheral surface of the slide portion 73 of the piston 63, whereas the inner part thereof is supported by the inner wall of the third accommodating portion 47. Annular grooves are formed on these parts of the outer peripheral surface, and seal members 88 and 89 are respectively attached thereto.

The plural (three in the present exemplary embodiment) cases 85 are formed in a tubular shape on the inner peripheral side of the support portion 84. The respective cases 85 are disposed correspondingly to the positions of the attachment portions 72 of the piston 63. Each case 85 has three openings 85a, 85b and 85c axially formed in alignment with each other. In more detail, the first opening 85a is formed in the outermost part of the case 85; the second opening 85b is formed on the inner side thereof; the third opening 85c (opening) is formed on the further inner side thereof. The inner diameter of the second opening 85b is greater than the diameter of the first opening 85a, while the inner diameter of the third opening 85c is further greater than that of the second opening 85b.

The fixation portion 86 is formed on the inner end of the support portion 84 while being protruded therefrom to the inner peripheral side. The fixation portion 86 is fixed to the sidewall of the third accommodating portion 47 by means of a plurality of bolts 90.

Each rod 79 is disposed along the axial direction within each case 85 of the carrier 78. The rod 79 has a rod main body 79a penetrating through the three openings 85a, 85b and 85c and a screw portion 79b (coupling portion) formed on the outer tip of the rod main body 79a. The outer diameter of the screw portion 79b is less than that of the rod main body 79a. Further, the screw portion 79b is screwed into the screw hole 72a of the attachment portion 72 of the piston 63. Therefore, the rod 79 is axially movable together with the piston 63. Further, an end surface of the rod main body 79a, on which the screw portion 79b is formed, makes contact with the end surface of the attachment portion 72 of the piston 63.

Each adjustment portion 80 is attached onto the rod 79, and is formed by members disposed in the third opening 85c, i.e., a washer 92 and a plurality of grip retaining rings 93. The washer 92 is axially movable with respect to the rod 79. Further, the outer diameter of the washer 92 is greater than the inner diameter of the second opening 85b. Therefore, the washer 92 is restricted from moving axially outwards while making contact with the outer end surface as the bottom surface of the third opening 85c. Further, the grip retaining rings 93 are engaged with the rod 79 with a predetermined friction force. When an axial force greater than or equal to the friction force acts on the grip retaining rings 93, the grip retaining rings 93 are axially moved relatively to the rod 79.

Each return spring 81 is disposed in the second opening 85b while being disposed on the outer peripheral side of the rod 79. One end of the return spring 81 makes contact with an end surface as the bottom surface of the second opening 85, while the other end thereof makes contact with the lateral surface of the washer 92. It should be noted that, as illustrated in FIG. 4, the return spring 81 urges the rod 79 and the piston 63 to the inner side through the washer 92 and the grip retaining rings 93 while the piston 63 is not actuated.

Each stopper 82 is formed in an annular shape and is disposed in the third opening 85c while the inner peripheral part thereof is penetrated by the rod 79. The stopper 82 has an annular groove formed on the outer peripheral surface thereof, and is supported by the inner peripheral surface of the third opening 85c through an elastic member 94 disposed in the annular groove. Further, the inner lateral surface of the stopper 82 makes contact with the sidewall of the third opening 85c, while the grip retaining rings 93 are contactable with the outer lateral surface of the stopper 82.

Action

Initial State

Figure 5:
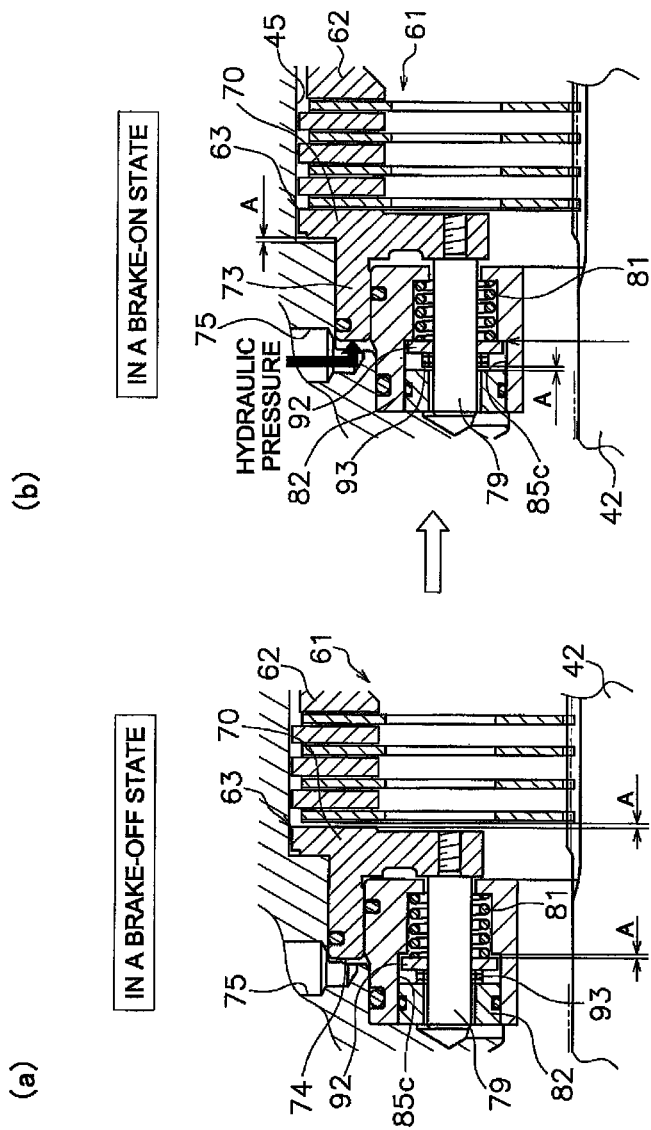
FIG. 5 is a diagram illustrating an initial state for explaining an action of the slack adjuster mechanism.

FIGS. 5(a) and 5(b) illustrate a brake-off state, i.e., an initial state that the brake disc plates 61 have not been abraded, and a brake-on state.

As represented in FIG. 5(a), the operating oil is not being supplied from the oil path 75 in the brake-off state. Further, the oil chamber 74, produced on the tip of the slide portion 73 of the piston 63, is drained through a control valve. In such state, the piston 63 is moved to the inner side and is set in a non-actuated position by the return spring 81. In more detail, the urging force of the return spring 81 is transmitted to the rod 79 through the washer 92 and the grip retaining rings 93. Therefore, the rod 79 and the piston 63 coupled to the tip of the rod 79 are moved to the inner side by means of the urging force of the return spring 81. The pressure portion 70 of the piston 63 is thereby separated away from the brake disc plates 61, and accordingly, the axle 42 is freely rotatable.

It should be noted that, in this initial state, a clearance A is reliably produced between the pressure surface of the pressure portion 70 of the piston 63 and the brake disc plates 61. Further, a similar clearance A is also reliably produced between the washer 92 and the axial end surface of the third opening 85c.

As represented in FIG. 5(b), the brake hydraulic pressure is supplied to the oil path 75 in the brake-on state. The end surface of the slide portion 73 receives the hydraulic pressure, and the piston 63 is moved to the outer side. Accordingly, the first disc plates 65 and the second disc plates 66 are pressed between the pressure portion 70 of the piston 63 and the back-up plate 62. Therefore, rotation of the first disc plates 65, i.e., rotation of the axle 42 is braked.

It should be noted that, in this state, a clearance A is produced between the rear surface of the pressure portion 70 of the piston 63 and an axial end of the first accommodating portion 45. Further, the rod 79, the grip retaining rings 93 and the washer 92 are moved to the outer side together with the piston 63 against the urging force of the return spring 81, and the washer 92 makes contact with the axial end surface of the third opening 85c. Therefore, a similar clearance A is produced between the grip retaining rings 93 and the stopper 82.

In Abrasion of Brake Disc Plates: Abrasion Amount B

Figure 6:
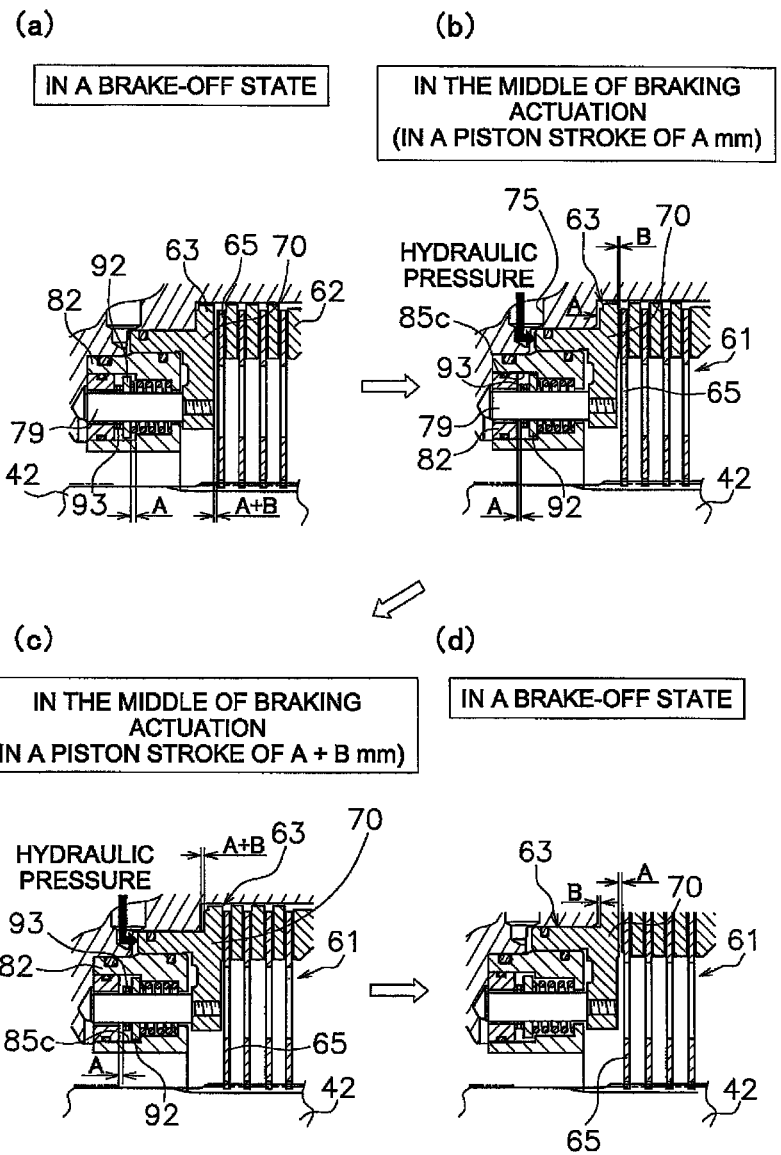
FIG. 6 is a diagram illustrating states of abrasion for explaining an action of the slack adjuster mechanism.

FIG. 6 illustrates states of an adjustment action in a brake-off state, a brake-on state and the middle of actuation, where the brake disc plates 61 (mainly the friction member of the first disc plates 65) are abraded by an abrasion amount B.

FIG. 6(a) illustrates the brake-off state. The brake-off state is basically similarly to that of FIG. 5(a), but a clearance (A+B), which is greater than the clearance in the initial state by the abrasion mount B, is produced between the pressure surface of the pressure portion 70 of the piston 63 and the first disc plates 65 by means of abrasion of the brake disc plates 61.

As illustrated in FIG. 6(b), the piston 63 is moved to the outer side when the brake hydraulic pressure is supplied through the oil path 75 in the aforementioned state. When the piston 63 is then moved by a displacement A, the washer 92 makes contact with the axial end surface of the third opening 85c, similarly to the case of the initial state. At this point of time, the piston 63 has been moved by the displacement A towards the first disc plates 65. However, the brake disc plates 61 are abraded by B compared to the initial state. Therefore, even when the piston 63 is moved by the displacement A, a clearance B exists between the pressure portion 70 of the piston 63 and the first disc plates 65, and therefore, the brake-on state is not produced.

An axial force, sufficiently greater than the friction force between the grip retaining rings 93 and the rod 79, is herein applied to the piston 63 by means of the brake hydraulic pressure. Therefore, the friction force of the grip retaining rings 93 with respect to the rod 79 is overcome by the brake hydraulic pressure, and as illustrated in FIG. 6(c), the rod 79 is slid against the grip retaining rings 93 and is further moved together with the piston 63 by the clearance B towards the first disc plates 65.

Through the aforementioned action, the pressure portion 70 of the piston 63 presses the first disc plates 65 and the brake-on state is produced. In this state, a clearance (A+B), corresponding to the initial clearance A+the abrasion amount B, is produced between the rear surface of the pressure portion 70 of the piston 63 and the axial end surface of the first accommodating portion 45. On the other hand, the clearance between the grip retaining rings 93 and the stopper 82 remains the same as the initial clearance A.

When the brake-off state is produced after the aforementioned adjustment action, the piston 63, the rod 79 and the grip retaining rings 93 are moved to the inner side by means of the urging force of the return spring 81. As described above, the brake-on state's clearance between the grip retaining rings 93 and the stopper 82 is herein A. Therefore, in turning brake off, the piston 63 is moved by the displacement A and is returned to the non-actuated position as illustrated in FIG. 6(d). In such state, a clearance B is produced between the rear surface of the pressure portion 70 of the piston 63 and the axial end surface of the first accommodating portion 45, whereas the clearance between the pressure portion 70 of the piston 63 and the first disc plates 65 becomes A similarly to the initial state.

As described above, even when the brake disc plates 61 are abraded, the rod 79 and the grip retaining rings 93 are moved relatively to each other by the abrasion mount. Accordingly, the stroke of the piston 63 can be maintained at the displacement A of the initial state. Therefore, the amount of the operating oil required for turning brake on is not increased, and also, a time lag in the brake-on state is not increased.

Features (1) The slack adjuster mechanism 57 is disposed on the inner peripheral side of the slide portion 73 of the piston 63. Therefore, increase in a radial dimension of the brake device 40 can be avoided. Further, an empty space within the axle housing 41 is utilized for disposing the slack adjuster mechanism 57. Therefore, it is not required to increase the axial dimension of the brake device 40.

(2) The slide portion 73 of the piston 63 has a diameter less than the outer diameter of the pressure portion 70, and accordingly, a compact structure is achieved.

Other Exemplary Embodiments

The present invention is not limited to the exemplary embodiment as described above, and a variety of changes or modifications can be herein made without departing from the scope of the present invention.

The backhoe loader has been explained as an exemplary work vehicle. However, the present invention can be similarly applied to other work vehicles such as a wheel loader.

The structure of the adjustment part is not limited to that of the aforementioned exemplary embodiment. For example, other members may be used instead of the grip retaining rings.

In the aforementioned exemplary embodiment, the rod 79 is fixed to the inner peripheral portion 72 of the piston 63 by means of a screw. However, the element for fixation is not limited to the screw.

The brake device of the illustrated embodiment is compactly structured because an axial space can be utilized for disposing the slack adjuster mechanism.

The invention claimed is:

1. A brake device for a work vehicle adapted to be disposed within an axle housing of the work vehicle, the brake device comprising:
    a brake unit including a brake disc plate, and a piston having a slide portion slidably supported by the axle housing and a pressure portion on which a pressure surface is formed for pressing the brake disc plate; and
    a slack adjuster mechanism that maintains a clearance between the piston and the brake disc plate at a predetermined clearance by mechanically adjusting a non-actuated position of the piston, the slack adjuster mechanism being formed by a member arranged on a piston rear surface side disposed on an opposite side from the brake disc plate and arranged further on an inner peripheral side than a slide portion of the piston, the member disposed further on the piston rear surface side than a pressure portion side end surface of the piston,
    wherein the slide portion of the piston is formed in a tubular shape and axially protruding from a lateral surface opposite to the pressure surface of the pressure portion,
    the slack adjuster mechanism includes
        a tubular carrier having a plurality of cases, the carrier being disposed on the inner peripheral side of the slide portion of the piston,
        a rod disposed within each of the cases and axially movable, the rod having a tip portion protruding from the case and being coupled to an inner peripheral part of the piston, the rod having a tip surface positioned further on the piston rear surface side than the pressure portion side end surface of the piston, and
        an adjustment portion disposed within each of the cases, the adjustment portion being configured to adjust a protruded amount of the rod from the case in a non-actuated state of the piston in accordance with an abrasion amount of the brake disc plate, and
    each of the cases includes sequentially from a brake unit side along an axial direction
        a first opening through which the rod penetrates,
        a second opening having a diameter greater than a diameter of the first opening, and
        a third opening in which the adjustment portion is disposed, the third opening having a diameter greater than the diameter of the second opening.

2. The brake device for a work vehicle recited in claim 1, wherein
    the adjustment portion includes a restriction member restricting an axial position of the rod with respect to the carrier while being held on an outer peripheral surface of the rod with a predetermined friction force, and
    the restriction member is configured to be axially moved with respect to the rod against a holding force attributed to friction in accordance with the abrasion amount of the brake disc plate when the piston is pressed towards the brake disc plate.

3. The brake device for a work vehicle recited in claim 2, wherein
    the restriction member has a diameter greater than an inner diameter of the second opening and is contactable with a bottom surface of the third opening when the piston is pressed towards the brake disc plate.

4. The brake device for a work vehicle recited in claim 2, wherein
    the slack adjuster mechanism further includes a stopper for stopping the restriction member held by the rod from moving, the stopper being disposed in the third opening.

5. A work vehicle comprising:
    a frame supporting a machinery;
    a cab mounted on the frame;
    a working unit disposed either forwards or rearwards of the cab;
    a plurality of wheels;
    an axle housing supported by the frame;
    an axle disposed inside the axle housing, the axle being coupled to the wheels; and
    the brake device recited in claim 1 for braking rotation of the axle.

6. The work vehicle recited in claim 5, further comprising a final reducer disposed between the axle and one of the wheels.

7. The work vehicle recited in claim 6, wherein
the brake device is disposed on a vehicle inner side of the final reducer.

8. The brake device for a work vehicle recited in claim 1, wherein
the slack adjuster mechanism further includes a return spring for retracting the rod and the piston to the non-actuated position when an actuating force is released from acting on the piston, and the return spring is disposed in the second opening.

9. The brake device for a work vehicle recited in claim 1, wherein
the rod includes
a rod main body penetrating through the first opening, the second opening and the third opening, and
a coupling portion formed on one end of the rod main body, the coupling portion having an outer diameter less than an outer diameter of the rod main body, the coupling portion being coupled to the piston and inserted into a hole formed in the inner peripheral part of the piston, and
a coupling portion side end surface of the rod main body contacts an end surface of the piston.

* * * * *